United States Patent
Greene et al.

(10) Patent No.: US 8,635,186 B2
(45) Date of Patent: *Jan. 21, 2014

(54) FILE-BACKED IN-MEMORY STRUCTURED STORAGE FOR SERVICE SYNCHRONIZATION

(71) Applicant: Microsoft Corporation, Redmond, WA (US)

(72) Inventors: Aaron K. Greene, Seattle, WA (US); Maheshwar Jayaraman, Redmond, WA (US); Lev Novik, Bellevue, WA (US); Michael R. Clark, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,205

(22) Filed: Feb. 25, 2013

(65) Prior Publication Data

US 2013/0173545 A1    Jul. 4, 2013

Related U.S. Application Data

(63) Continuation of application No. 12/879,462, filed on Sep. 10, 2010, now Pat. No. 8,392,369.

(51) Int. Cl.
    *G06F 17/30* (2006.01)
(52) U.S. Cl.
    USPC ............ 707/635; 707/771; 707/690; 707/634
(58) Field of Classification Search
    USPC .......................................... 707/635, 690, 634
    See application file for complete search history.

(56) References Cited

U.S. PATENT DOCUMENTS

| | | | |
|---|---|---|---|
| 5,928,329 A * | 7/1999 | Clark et al. | 709/227 |
| 6,202,085 B1 | 3/2001 | Benson | |
| 6,578,054 B1 | 6/2003 | Hopmann | |
| 6,636,873 B1 * | 10/2003 | Merchant et al. | 1/1 |
| 7,539,827 B2 | 5/2009 | Shah et al. | |
| 7,627,729 B2 | 12/2009 | Bartfai | |
| 7,680,941 B2 | 3/2010 | Blotch | |

(Continued)

OTHER PUBLICATIONS

Suel et al., "Improved File Synchronization Techniques for Maintaining Large Replicated Collections over Slow Networks," (2004) Proceedings of the 20th International Conference on Data Engineering, http://www.cs.utah.edu/~shanth/stuff/Independent%20Study/dup_elim/file_synch.pdf.

(Continued)

*Primary Examiner* — Jean M Corrielus
(74) *Attorney, Agent, or Firm* — Workman Nydegger

(57) ABSTRACT

Providing synchronization to a local system. Embodiments may include downloading a batch of changes in a heterogeneous batch. The batch of changes is correlated to an anchor affiliated with a synchronization service. The anchor is a reference point indicating time or relative order. The batch of changes and the anchor are serialized to a non-volatile storage medium as a heterogeneous set. After serializing the batch of changes to a non-volatile storage medium as a heterogeneous set, entities in the batch of changes are parsed out into entities in in-memory representations. Similarly, embodiments may receive user input modifying a plurality of data entities, store on a non-volatile storage medium a serialized heterogeneous representation of the modified data entities, and upload the serialized heterogeneous representation to a synchronization service.

20 Claims, 4 Drawing Sheets

(56) References Cited

U.S. PATENT DOCUMENTS

| | | |
|---|---|---|
| 7,739,250 B1 * | 6/2010 | Hamilton et al. .............. 707/690 |
| 7,941,785 B2 | 5/2011 | Cole |
| 8,046,424 B2 | 10/2011 | Novik et al. |
| 8,060,534 B1 | 11/2011 | Ansari et al. |
| 8,392,369 B2 * | 3/2013 | Greene et al. ................ 707/635 |
| 2002/0073080 A1 | 6/2002 | Lipkin |
| 2002/0073236 A1 * | 6/2002 | Helgeson et al. ............. 709/246 |
| 2007/0078941 A1 | 4/2007 | Dun |
| 2008/0140960 A1 | 6/2008 | Basler |
| 2010/0017496 A1 | 1/2010 | Kimmel |
| 2010/0049929 A1 | 2/2010 | Nagarkar |
| 2011/0167041 A1 * | 7/2011 | Fu et al. ........................ 707/634 |
| 2012/0066180 A1 * | 3/2012 | Greene et al. ................ 707/635 |
| 2013/0110873 A1 * | 5/2013 | Romem et al. ................ 707/771 |
| 2013/0173545 A1 * | 7/2013 | Greene et al. ................ 707/635 |

OTHER PUBLICATIONS

Office Action dated Jun. 21, 2012 cited in U.S. Appl. No. 12/879,462.
Notice of Allowance dated Nov. 2, 2012 cited in U.S. Appl. No. 12/879,462.

* cited by examiner

FILE-BACKED IN-MEMORY STRUCTURED STORAGE FOR SERVICE SYNCHRONIZATION

CROSS-REFERENCE TO RELATED APPLICATIONS

This application is a continuation of U.S. patent application Ser. No. 12/879,462, filed on Sep. 10, 2010, entitled "FILE-BACKED IN-MEMORY STRUCTURED STORAGE FOR SERVICE SYNCHRONIZATION," which issued as U.S. Pat. No. 8,392,369 on Mar. 5, 2013, and which application is expressly incorporated herein by reference in its entirety.

BACKGROUND OF THE INVENTION

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

With the interconnection of computer systems comes the ability of different systems to share data. When data is shared, there are often multiple copies of the data, with varying levels of freshness. For example, data may be sent from a first system to a second system, and then immediately changed at the first system. The data at the second system would then be out of date as soon as the changes are made at the first system. Alternatively, data may be sent from a first system to a second system, and then changed at the first system and the second system which would result in there being a conflict as to which data is the freshest.

These issues can be addressed by various synchronization and conflict resolution systems and algorithms. However, some synchronization and conflict resolution systems work at an entity level, such that data must be organized into entities or in-memory representations before synchronization or conflict resolution can occur.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments may include functionality for providing synchronization to a local system. Embodiments may include downloading a batch of changes in a heterogeneous batch. The batch of changes is correlated to an anchor affiliated with a synchronization service. The anchor is a reference point indicating time or relative order. The batch of changes and the anchor are serialized to a non-volatile storage medium as a heterogeneous set. After serializing the batch of changes to a non-volatile storage medium as a heterogeneous set, entities in the batch of changes are parsed out into entities in in-memory representations. Similarly, embodiments may receive user input modifying a plurality of data entities, store on a non-volatile storage medium a serialized heterogeneous representation of the modified data entities, and upload the serialized heterogeneous representation to a synchronization service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments implement an in-memory structured data store that is optimized for synchronization and offline access by serializing heterogeneous batches of changes of entities in the data store to a non-volatile storage medium. Embodiments may implement a structure store built for synchronization in which the data in the store is kept in memory for fast access but also maintained in files to support access to online data when applications are offline. Specifically, some embodiments write different types of files for downloaded incremental batches of changes and local changes, and those files are later read and written to in-memory entity representations. Embodiments may implement a data access layer built on top of these files and a mechanism by which redundant data in files can be cleaned from persistent storage, such as from disk.

Included herein is a description of a mechanism by which incremental sync changes and local changes can be written to disk. This may provide a solution for allowing an interrupted sync to continue while redundant data need not be requested over the network again. Changes saved by the user and by sync may be written as soon as possible to ensure minimal data loss in the event of application termination.

Embodiments may provide entity-based in-memory structured storage that tracks changes for synchronization. Embodiments may also have features directed to approaches by which data is coalesced (i.e. archived) to reduce the amount of redundant data stored on disk.

Figure 1:
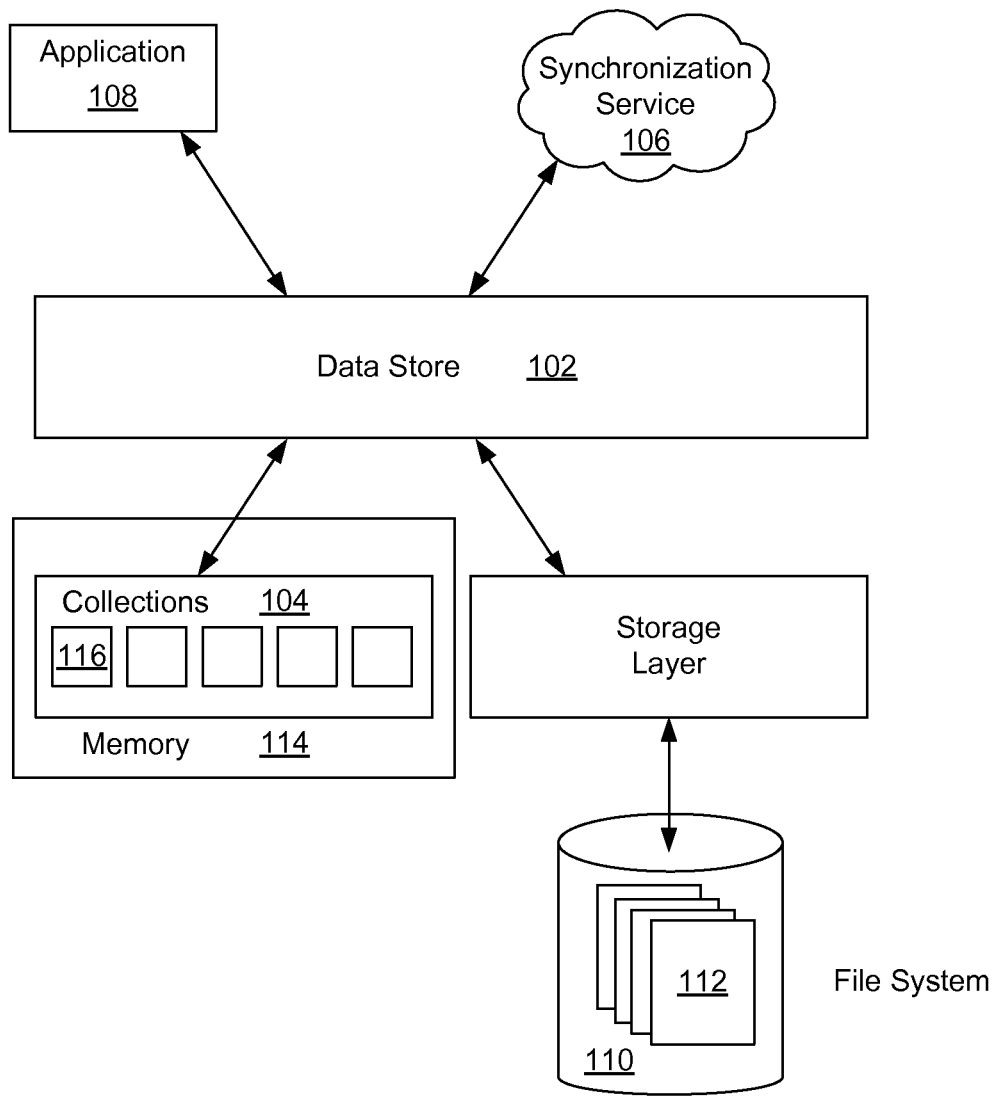
FIG. 1 illustrates a data store coupled to an in-memory representation of entities, an application, a synchronization service, and persistent storage.

Referring now to FIG. 1, one embodiment is illustrated. A data store 102 works by providing in-memory 114 collections 104 of entities (each collection 104 representing a single entity, for example a single data type) designed to work with an anchor-based incremental synchronization service 106. A synchronization anchor may be a reference point, such as a reference point in time associated with a change or batch of changes indicating time or relative order changes are applied from the perspective of a synchronization service 106. Applications 108 can retrieve the data from these collections 104 and perform various CRUD (create, read, update or delete) operations on them. At the same time, the data is persisted to a file system 110 such as a disk or other persistent or non-volatile storage in a set of files 112. Embodiments may be implemented using functionality to persist data to non-volatile storage as soon as possible, to attempt to ensure that no data is lost or needs to be retrieved from the synchronization service 106 multiple times.

The data store 102 may perform change tracking on entities and in some embodiments allows for a notion of implicit transactions. A transaction is a set of operations that either all succeed or all fail. If all operations of a transaction succeed, changes to data entities by operations of the transaction are persisted. If a transaction fails, changes to data entities by operations of the transaction are rolled back. Embodiments support implicit transactions by allowing changes to multiple entities to be made before they are saved (if the implicit transaction succeeds) or rolled back (if the implicit transaction fails). Persisted data may be used to roll back operations.

One priority of the data store 102 may be to persist data to the file system 110, such as disk, as soon as it is received from a service 106 or saved by an application 108. To do this, the data store 102 writes different types of files 112 that represent different operations on the data store 102. One approach for writing data is described below.

In some embodiments, the data store 102 maintains a monotonically increasing tick count for each file that it writes. The tick count may be, for example, an eight-digit hexadecimal number that is included as part of the file name to ensure that the files are sorted in the order that they are written. When files are read, the file tick count is set to one more than the greatest tick count that was part of a file that was successfully read. Other types of counts or indexes may be alternatively used to order files in the order that they are written. In some embodiments, an underlying file system 110 allows applications to retrieve information for files such as the last-write time or the creation time. Thus, using the current date time may be used. However this may not be as robust, such as for example when there is a risk that local computer time may be changed. For example a change may be made to an entity, followed by a rolling back of current date and time on the system, followed by a subsequent change to the entity. The subsequent change would be the most current, but this would not be detectable inasmuch as a time stamp associated with the subsequent change would be earlier in time to the first change.

Embodiments may be implemented that employ differentiating file names or extensions. For example, in some embodiments, each type of file that is written will have the specific extension that allows it to be differentiated from other types of files. In particular, as will be discussed in more detail below, some embodiments implement or use six file types: a download file, a local change file, an upload response file, a conflict file, an error file, and/or an archive file. Each of these file types may include a name or extension that helps to differentiate them from each other.

When a batch of changes come from the service 106, a download file 112 is written that contains the entities that were received from the change batch and a synchronization anchor that came with those changes. A synchronization anchor may be a reference point in time for the change batch that where anchors are synchronized from the service 106.

When the application 108 makes changes and saves them, the changes are written to a local change file 112. In the illustrated embodiment, this file contains only the entities (e.g. data objects) from the set of changes that was saved as a result of changes by the application 108, and not the synchronization anchor, because it was not affiliated with a synchronization service 106 action. When the application 108 chooses to save changes, the in-memory 114 changes are cloned and stored in a separate heterogeneous collection at the file system 110. This allows for fast enumeration during synchronization and also protects the data from issues surrounding concurrent access to the data.

When the application 108 uploads locally saved changes to the service 106, the service 106 will reply with an upload response that contains an updated anchor affiliated with the synchronization service 106 and information about any conflicts or errors that occurred on the service 106. In the event that the service 106 resolved the conflicts or handled the errors, the data included in the upload response will contain the current versions of the entities as they exist in the service 106 and the entities that lost the conflict resolution or failed to apply as a result of errors. Inasmuch as resolved conflicts and errors are entirely informational, the data store 102 may be implemented in some embodiments to allow applications 108 to clear them one at a time or all together. Thus, in some embodiments, applications may be able to process conflicts and errors individually and quickly without needing to scan an entire dataset. To accommodate this, in some embodiments, each conflict and error is written in its own conflict file 112 or error file 112, respectively. Embodiments may also write an upload to a response file 112 which contains the current versions of the entities as they exist on the service without the conflict information so that if the conflict/error files are cleared, the updated entities still remain.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
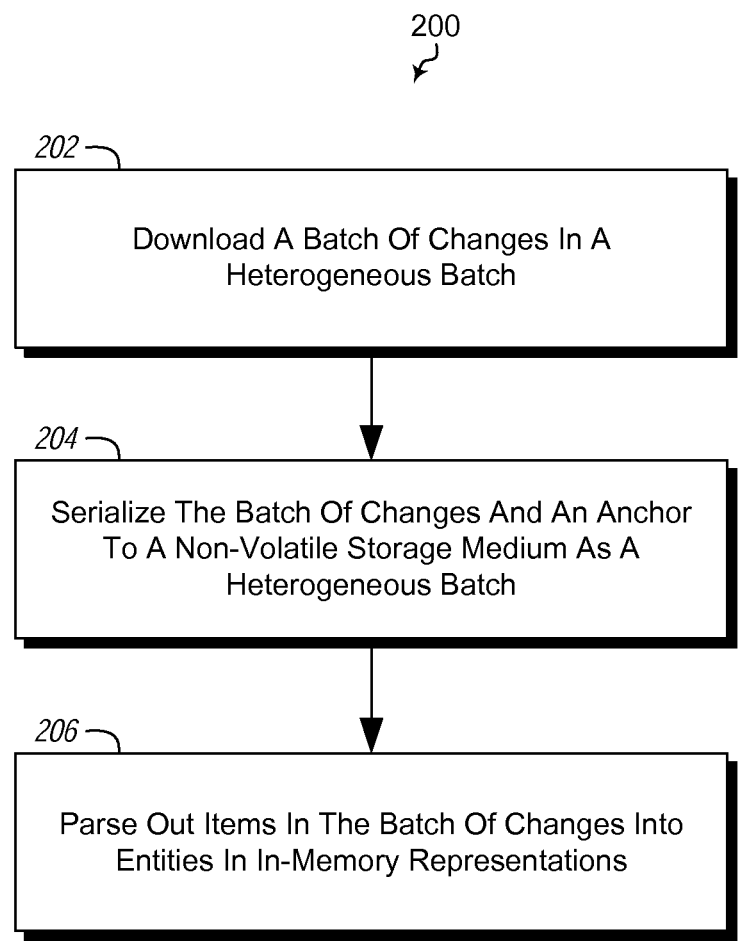
FIG. 2 illustrates a method of providing synchronization of data entities.

Referring now to FIG. 2, a method 200 is illustrated. The method 200 illustrates a method of providing synchronization to a local system. The method 200 includes downloading a batch of changes in a heterogeneous batch (act 202). The batch of changes are correlated to an anchor. The anchor is a reference point indicating time or relative order. The anchor may be affiliated with and provided by a synchronization service, such as the synchronization service 106.

The method 200 further includes serializing the batch of changes to a non-volatile storage medium as a heterogeneous set (act 204). For example the batch of changes may be stored in a download file 112 in the file system 110.

After serializing the batch of changes to a non-volatile storage medium as a heterogeneous set, the method 200 further includes parsing out entities in the batch of changes into entities in in-memory representations (act 206). For example, entities may be parsed into a collection 116. In particular, they may be parsed into separate collections according to their type so that each collection is homogeneous.

The method 200 may be practiced where the batch of changes in the heterogeneous batch is a delta from a previous in memory representation. In particular, rather than downloading all entities represented in a collection 116 or collections 104, only those entities that have changes since a previous synchronization are downloaded. In some examples of this embodiment, parsing out entities in the batch of changes into entities in in-memory representations may include combining changes in the batch of changes with an existing in-memory representation.

Alternatively, the method 200 may be practiced wherein parsing out entities in the batch of changes into entities in in-memory representations includes creating a new in-memory representation. This may be performed, for example, when no previous in-memory representations exist for entities in the batch of changes.

The method 200 may be practiced where serializing the batch of changes to a non-volatile storage medium as a heterogeneous set includes storing the batch of changes to a file system as a single download file that contains all of the entities sent in the batch of changes. In some embodiments, the single download file may include a file name or extension that indicates that the download file is a download file that contains entities sent in a batch of changes. As noted above, this may be used when several different types of files are maintained by the data store to differentiate the different types of files. Similarly, embodiments may be practiced where the single download file includes a file name or extension that includes a tick count representing a relative order position that the download file was written to the non-volatile storage medium. Tick counts are discussed in more detail above.

The method 200 may be practiced wherein the acts are performed to provide a level of consistency without the use of atomic transactions. Embodiments allows for a notion of implicit transactions. A transaction is a set of operations that either all succeed or all fail. If all operations of a transaction succeed, changes to data entities by operations of the transaction are persisted. If a transaction fails, changes to data entities by operations of the transaction are rolled back. Embodiments support implicit transactions by allowing changes to multiple entities to be made before they are saved (if the implicit transaction succeeds) or rolled back (if the implicit transaction fails). Persisted data may be used to roll back operations.

Figure 3:
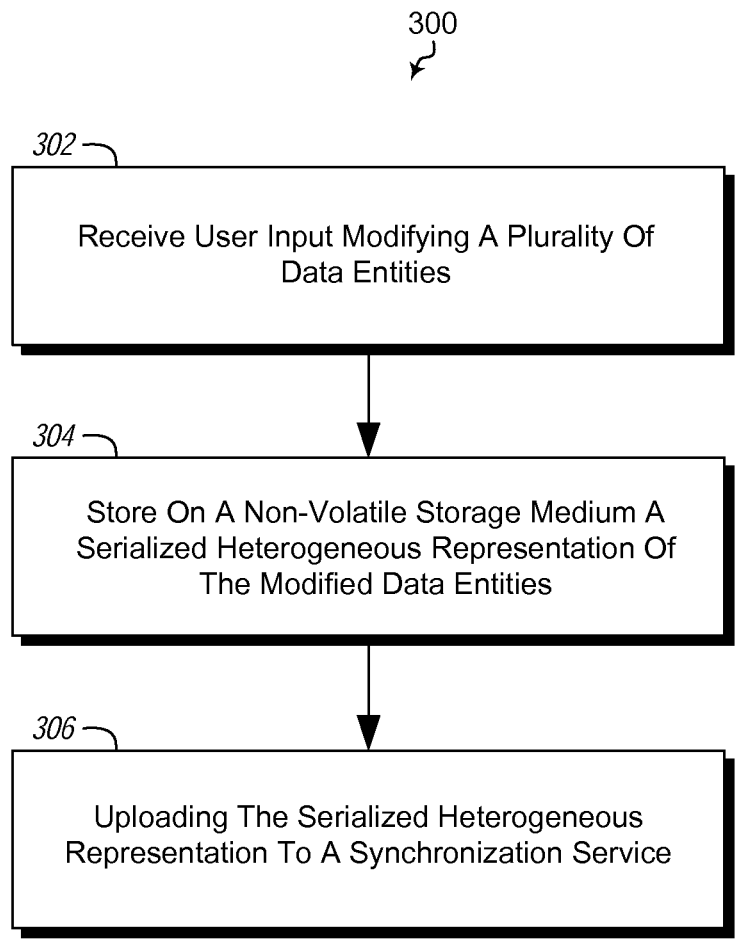
FIG. 3 illustrates another embodiment method of providing synchronization of data entities.

Referring now to FIG. 3, a method 300 is illustrated. The method 300 may be practiced in a computing environment and includes acts for providing synchronization of data entities. The method includes at an application, receiving user input modifying a plurality of data entities (act 302). For example, a user interacting with an application 108 may cause changes to entities stored in a collection 116.

The method 300 further includes storing on a non-volatile storage medium a serialized heterogeneous representation of the modified data entities. For example, a local change file may be stored to the file system 100.

The method 300 further includes uploading the serialized heterogeneous representation to a synchronization service. For example, the changes may be uploaded to the synchronization service 106.

As noted above, the method 300 may be practiced where the serialized heterogeneous representation comprises a single local change file stored in a file system. The method may be practiced where the single local change file includes a file name or extension that indicates that the local change file is a local change file that contains entities sent in a batch of changes. The method 300 may be practiced where the single local change file includes a file name or extension that includes a tick count representing a relative order position that the local change file was written to the non-volatile storage medium.

The method 300 may further include receiving an upload response from the synchronization service. The upload response includes an anchor affiliated with the synchronization service and correlated to the serialized heterogeneous representation of the modified data entities. The anchor is a reference point indicating time or relative order from the perspective of the synchronization service. The upload response further includes information about conflicts between entities at the synchronization service and entities in the uploaded serialized heterogeneous representation including current versions of the entities as they exist in the service and entities that lost a conflict resolution or failed to apply as a result of errors. This embodiment of the method may further include retrieving the current entities from the conflict information and storing them in an upload response file along with the anchor affiliated with the synchronization service that was returned. As with other embodiments illustrated herein, the upload response file may be stored to the file system 110 and may include a file name and/or extension that identifies the file as an upload response file and/or includes an indication of a tick count from the perspective of the data store 102.

Embodiments may further include writing each conflict or error in its own conflict file or error file respectively. This can facilitate embodiments where clearing conflicts and/or errors is performed on each conflict or error one at a time. However, alternative embodiments clearing conflicts and/or errors may be performed as a batch.

The above approaches can potentially lead to a great deal of redundant data on the file system 110. If an entity is downloaded, modified and saved, and then uploaded with a conflict, there will be three copies of the entity stored on the file system 110, despite the fact that only one entity exists in memory 114. To mitigate this, the data store 102 may periodically archive the files 112 and collapse them into a single archive file 112. The algorithm for this, is illustrated as follows:

Embodiments may first retrieve a list of files 112 stored for the data store 102 and sorted in reverse order, so that the most recently written files 112 are written at the front of the list. A dictionary is created to store the entities that have been serialized to the archive file 112. The archive anchor is set to null.

A snapshot of the current tick count is obtained, and the tick count is incremented. Any files whose tick count is greater than the snapshot tick count is ignored. This avoids issues with other data store operations occurring during file writing, because they will have a greater tick count.

For each eligible file 112 (i.e those files with a tick count less than the incremented tick count), at least a portion of the file is read. If the file is not a conflict or error file, then for each entity, if the entity key does not exist in the serialized entities dictionary, the entity is written to the archive file and its key is added to the serialized entity dictionary. The archive anchor will initially be null. If the first files that are read (in reverse order) are saved changes, the anchor will remain null. If a download file, upload response file, or another anchor file is read, the anchor will become non-null. In particular, if the archive anchor is null when a file is read, then the archive anchor becomes the one in that file (if the file contains an anchor). This basically has the effect of making the archive anchor the one from the most recently written file. Additionally, embodiments, may store a flag with each entity in the archive file specifying whether or not it is a local change. This flag will be true for every entity that is read from a local change file until an upload response file is encountered, at which point it will be false for all other local change files. Entities from download and upload response files will always be marked as false.

If all files are read successfully without exceptions, the archive anchor is written to the file and all files are deleted for which the data was included in the archive file.

The data store 102 reads data in reverse to avoid duplicates in the archive file 112 and avoid multiple passes on the data. Because this operation is happening on files 112 that are being read into memory 114, rather than on the data that are already in memory 114, this can lead to an increase in the process memory that is being used by the data store 102. Avoiding multiple passes on the data avoids this by only reading into memory 114 the amount of data that is in the file system 110.

Figure 4:
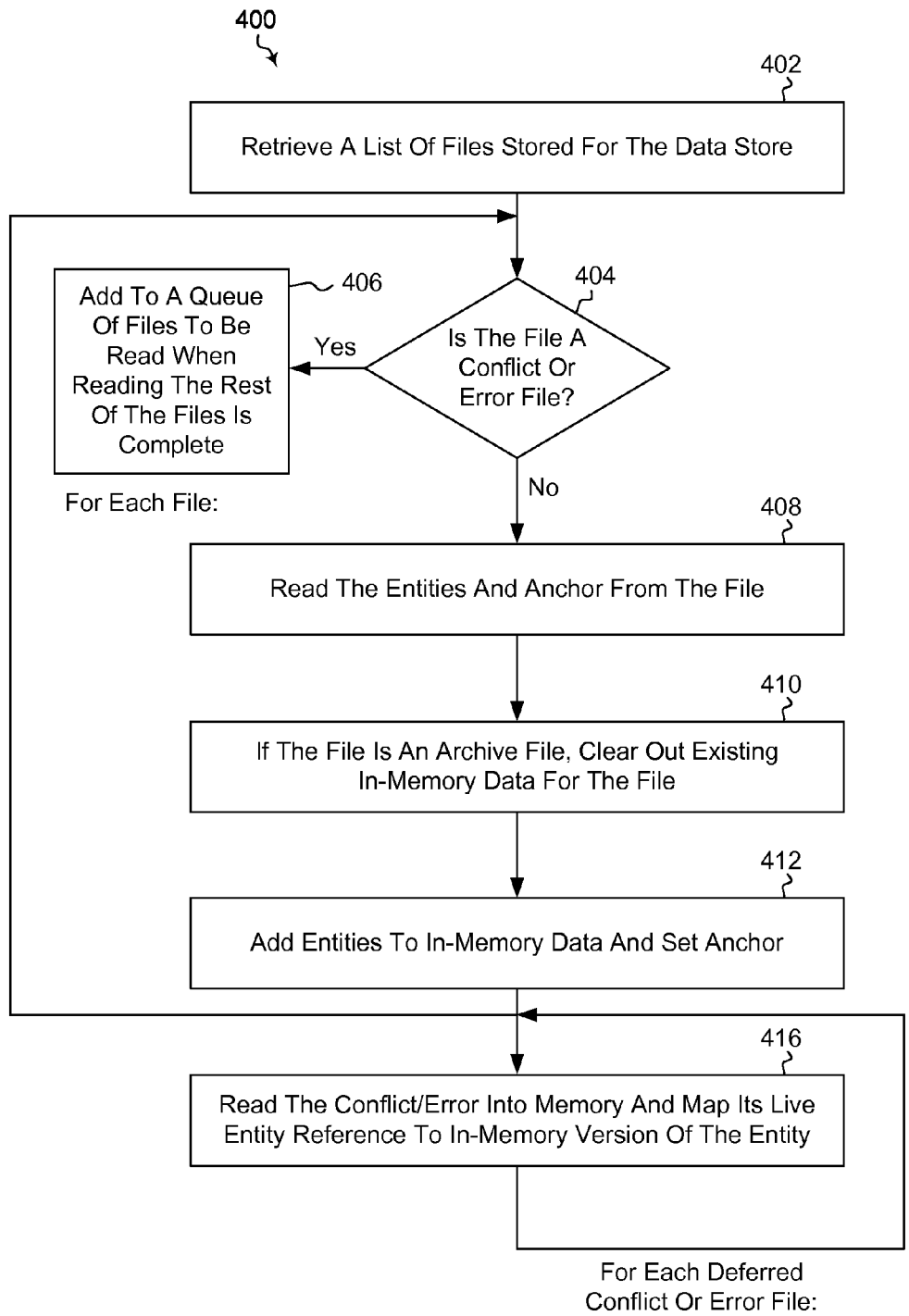
FIG. 4 illustrates a method of reading and parsing out data entities.

The following illustrates examples of reading data. Embodiments may be implemented where the data store 102 reads data only once, at the beginning of the process. This ensures that access to data from the application 108 is fast. Reading the data may be performed as follows and shown in FIG. 4 in a method 400. FIG. 4 illustrates at 402 an act of Retrieve the list of files for the data store (act 402). In some embodiments, the list of files is sorted by file name so that they are read in order. This may be done, for example, by using the tick count as the first part of the file name. For each file 112, a determination is made as illustrated at 404. If the file 112 is a conflict or error file, as illustrated at 406, it is added to a queue of files to be read when reading the rest of the files is complete (as illustrated at 416).

If the file is not a conflict or error file, the entities and anchor from the file are read, if available as illustrated at 408. If the file is an archive file, existing in-memory 114 data is cleared out as illustrated at 410 Entities are added to in-memory 114 data an anchor is set as illustrated at 412.

As illustrated at 416, for each deferred conflict or error file, the conflict or error is read into memory 114 and its live entity reference is mapped to an in-memory 114 version of the entity. This may be done so that in-memory entities can be retrieved by the application. In some embodiments, in-memory entities are not updated because the in-memory entities are updated from the upload response file.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A hardware storage device having stored computer-executable instructions which, are executable by at least one hardware processor of a computing system having a non-volatile file system and memory for implementing the following:
    downloading a batch of changes in a heterogeneous batch, wherein the batch of changes is correlated to an anchor affiliated with a synchronization service,
    wherein the anchor, which is received from the synchronization service, is a reference point indicating time or relative order;
    serializing the batch of changes and the anchor to a non-volatile storage medium as a heterogeneous set, such that the batch of changes, which includes a plurality of changes to a plurality of different entity types is stored as a single file in the non-volatile file system;
    after serializing the batch of changes to a non-volatile storage medium as a heterogeneous set, parsing out entities in the batch of changes into a plurality of different homogeneous collections of entities by entity type, such that different entity types are grouped together into different collections;
    storing the different entity types as separate collections as in-memory representations, such that the different entities in the batch of changes that are received from the synchronization service are maintained as in-memory representations that are separated by entity type as well as within a file in the file system that is associated with the anchor and that includes a grouping of heterogeneous entity changes;
    detecting modification to a plurality of data entities and storing on the non-volatile storage medium a serialized heterogeneous representation of the modified data entities in a local change file that excludes the anchor;
    uploading the serialized heterogeneous representation included in the local change file to the synchronization service; and
    receiving an upload response from the synchronization service, wherein the upload response comprises a corresponding new anchor.

2. The storage device of claim 1, wherein the batch of changes in the heterogeneous batch is a delta from a previous in-memory representation.

3. The storage device of claim 2, wherein the parsing out entities in the batch of changes into entities in in-memory representations comprises combining changes in the batch of changes with an existing in-memory representation.

4. The storage device of claim 1, wherein the parsing out entities in the batch of changes into entities in in-memory representations comprises creating a new in-memory representation.

5. The storage device of claim 1, wherein the serializing the batch of changes to a non-volatile storage medium as a heterogeneous set comprises storing the batch of changes to a file system as a single download file that contains all of the entities sent in the batch of changes.

6. The storage device of claim 5, wherein the single download file comprises a file name or extension that indicates that the download file is a download file that contains entities sent in a batch of changes.

7. The storage device of claim 5, wherein the single download file comprises a file name or extension that includes a tick count representing a relative order position that the download file was written to the non-volatile storage medium.

8. The storage device of claim 1, wherein the acts are performed to provide a level of consistency without the use of atomic transactions.

9. The storage device of claim 1, wherein the computer-executable instructions, when executed by the at least one processor, are further configured to implement the following:
    based on information in the upload response, storing the at least one current version of an entity that is also included in the upload response in an upload response file along with the new anchor returned with the upload response; and
    storing any conflict or error returned in the upload response in a conflict file or error file, respectively, without the new anchor.

10. The storage device of claim 1, computer-executable instructions, when executed by the at least one processor, are further configured to implement the following:
    retrieving a list of files;
    for each file that is a conflict or error file, adding the file to a queue of files to be read when reading the rest of the files is complete;
    for each file that is not a conflict or error file, reading entities and an anchor from the file, when the anchor is available; and if the file is a file with an anchor affiliated with the synchronization service then clearing out existing in-memory data associated with the file; and
    for each deferred conflict or error file added to the queue of files, reading the conflict or error into memory and mapping the conflict or error as a live entity reference to an in-memory version of the entity.

11. A computing system comprising:
    at least one processor; and
    memory having stored computer-executable instructions which, when executed by the at least one processor, implement a method of providing synchronization, the method comprising:
        downloading a batch of changes in a heterogeneous batch, wherein the batch of changes is correlated to an anchor affiliated with a synchronization service,
        wherein the anchor, which is received from the synchronization service, is a reference point indicating time or relative order;
        serializing the batch of changes and the anchor to a non-volatile storage medium as a heterogeneous set, such that the batch of changes, which includes a plurality of changes to a plurality of different entity types is stored as a single file in the non-volatile file system;
        after serializing the batch of changes to a non-volatile storage medium as a heterogeneous set, parsing out entities in the batch of changes into a plurality of different homogeneous collections of entities by entity type, such that different entity types are grouped together into different collections;
        storing the different entity types as separate collections as in-memory representations, such that the different entities in the batch of changes that are received from the synchronization service are maintained as in-memory representations that are separated by entity type as well as within a file in the file system that is associated with the anchor and that includes a grouping of heterogeneous entity changes;

detecting modification to a plurality of data entities and storing on the non-volatile storage medium a serialized heterogeneous representation of the modified data entities in a local change file that excludes the anchor;

uploading the serialized heterogeneous representation included in the local change file to the synchronization service; and receiving an upload response from the synchronization service, wherein the upload response comprises a corresponding new anchor.

12. The computing system of claim 11, wherein the batch of changes in the heterogeneous batch is a delta from a previous in-memory representation.

13. The computing system of claim 12, wherein the parsing out entities in the batch of changes into entities in in-memory representations comprises combining changes in the batch of changes with an existing in-memory representation.

14. The computing system of claim 11, wherein the parsing out entities in the batch of changes into entities in in-memory representations comprises creating a new in-memory representation.

15. The computing system of claim 11, wherein the file in the file system comprises a file name or extension that indicates that the download file is a download file that contains entities sent in a batch of changes, the file name or extension also including a tick count representing a relative order position that the file was written to the file system.

16. The computing system of claim 11, wherein the acts are performed to provide a level of consistency without the use of atomic transactions.

17. A computer-implemented method of providing synchronization to a local computing system, the method comprising:

downloading a batch of changes in a heterogeneous batch, wherein the batch of changes is correlated to an anchor affiliated with a synchronization service, wherein the anchor, which is received from the synchronization service, is a reference point indicating time or relative order;

serializing the batch of changes and the anchor to a non-volatile storage medium as a heterogeneous set, such that the batch of changes, which includes a plurality of changes to a plurality of different entity types is stored as a single file in the non-volatile file system;

after serializing the batch of changes to a non-volatile storage medium as a heterogeneous set, parsing out entities in the batch of changes into a plurality of different homogeneous collections of entities by entity type, such that different entity types are grouped together into different collections;

storing the different entity types as separate collections as in-memory representations, such that the different entities in the batch of changes that are received from the synchronization service are maintained as in-memory representations that are separated by entity type as well as within a file in the file system that is associated with the anchor and that includes a grouping of heterogeneous entity changes;

detecting modification to a plurality of data entities and storing on the non-volatile storage medium a serialized heterogeneous representation of the modified data entities in a local change file that excludes the anchor;

uploading the serialized heterogeneous representation included in the local change file to the synchronization service; and receiving an upload response from the synchronization service, wherein the upload response comprises a corresponding new anchor.

18. The method of claim 17, wherein the batch of changes in the heterogeneous batch is a delta from a previous in-memory representation and wherein parsing out entities in the batch of changes into entities in in-memory representations comprises combining changes in the batch of changes with an existing in-memory representation.

19. The method of claim 17, wherein the file contains all of the entities sent in the batch of changes, and wherein the file further comprises:

a file name or extension that indicates that the download file is a download file that contains entities sent in a batch of changes; and a tick count representing a relative order position that the download file was written to the non-volatile storage medium.

20. The method of claim 17, wherein the upload response further includes at least one current version of an entity that corresponds to the batch of changes.

* * * * *